United States Patent [19]

Sawyer

[11] 3,857,075
[45] Dec. 24, 1974

[54] POSITIONING DEVICE

[76] Inventor: Bruce A. Sawyer, 20120 Allentown Dr., Woodland Hills, Calif. 91364

[22] Filed: Jan. 15, 1973

[21] Appl. No.: 323,408

Related U.S. Application Data

[63] Continuation of Ser. No. 163,597, July 19, 1971, abandoned.

[52] U.S. Cl................. 318/38, 310/12, 346/29, 318/135
[51] Int. Cl. ........................................... H02k 41/02
[58] Field of Search .............................. 310/12–14; 318/38, 135, 33, 683; 346/29

[56] References Cited
UNITED STATES PATENTS

| | | | |
|---|---|---|---|
| 3,449,754 | 6/1969 | Stutz | 318/135 UX |
| 3,457,482 | 7/1969 | Sawyer | 318/38 |

*Primary Examiner*—D. F. Duggan
*Attorney, Agent, or Firm*—Smyth, Roston & Pavitt

[57] ABSTRACT

This invention relates to apparatus for providing a controlled movement of an output member such as a stylus or a tool along a pair of coordinate axes. A pair of tracks are disposed in spaced relationship along one of the coordinate axes and a beam is disposed between the tracks in a direction transverse to the tracks. First means such as first motive means are disposed in spaced but contiguous relationship to the tracks to move along the tracks. The first means are coupled to the beam to maintain the beam in spaced but contiguous relationship to the tracks and to drive the beam along the tracks.

Second means such as second motive means are disposed in spaced but contiguous relationship to the beam and are coupled to the beam to move along the beam. The second means are coupled to the output member to drive the output member.

35 Claims, 11 Drawing Figures

Patented Dec. 24, 1974

POSITIONING DEVICE

This is a continuation, division of application Ser. No. 163,597, filed July 19, 1971 now abandoned.

This invention relates to apparatus for providing a controlled movement of an output member along a pair of coordinate axes with a minimum of friction between any of the parts in the apparatus. The invention particularly relates to apparatus including a beam which provides movement along a first axis and which supports means such as motive means in frictionless relationship for providing a movement of an output member along a second axis.

Systems for driving an output member such as a cutting tool or stylus along a pair of coordinate axes have been known for a considerable number of years. In that time, considerable effort has been devoted to perfecting such systems so that the systems will be responsive to the operation of a computer for driving the output member along the pair of coordinate axes. Generally the systems have used a pair of spaced tracks disposed along a first one of the coordinate axes and an arm supported by guides at the spaced tracks. The arm has been moved along the tracks in a frictional relationship to the tracks. The arm has in turn supported a second member by wires. The second member has been movable along the second coordinate axis in accordance with the forces exerted on the wires to displace the wires. The second member has been disposed in a frictional relationship to the arm. The output member has been supported on the second member.

The systems described above have had certain important disadvantages. One major disadvantage has been the large mass of the arm required to support drive means such as lead screws and motors. Attempts to reduce such arm mass have resulted in reductions in stiffness, causing large resonance effects and other problems. Furthermore, the large mass required for the arm has caused the response time of the system to increase so that the system has not been able to respond quickly. Another disadvantage has been the friction between the arm and the tracks, the members of the lead screw mechanisms and between the second member and the arm. Such friction has limited the speed at which the arm has been able to move along the tracks and at which the second member has been able to move along the arm. Such friction has also tended to produce wear of the arm and the second member. The systems described above have also been disadvantageous in that the output member such as the tool or stylus has had limited visibility. A further disadvantage has been that the system has not inherently provided an indication as to the position of the output member at each instant so that complex arrangements have had to be provided to obtain such indications.

Considerable effort has been made over a considerable number of years to provide a system which overcomes the above disadvantages. In spite of such effort, such disadvantages have not been overcome in the systems employing an arm and a second member such as described above.

This invention provides a system for overcoming the disadvantages described above. The invention provides a pair of tracks disposed in spaced relationship along a first axis. First means such as reluctance motors are disposed in spaced but contiguous relationship to the tracks and interact with the tracks to move along the tracks. The first means may be constructed in one embodiment in a manner similar to that described in U.S. Pat. No. 3,457,482 issued to me on July 22, 1969. Some advantages of providing reluctance motors are that the drive means are integral with the motor reducing mass, also, the drive means and motor exclude friction elements, thereby providing extended life even at maximum performance levels. Another advantage of providing first means such as reluctance motors is that the displacement of the first means along the tracks is indicated by the interaction between the first means and the tracks.

The first means support a beam in spaced but contiguous relationship to the tracks such that the beam is moved by the first means such as a pair of reluctance motors along the tracks. The beam is disposed in a direction transverse to the tracks. Second means such as another reluctance motor are in turn disposed in spaced but contiguous relationship to the beam and interact with the beam to move along the beam. Each of the first and second means may also be constructed in a manner similar to that described in U.S. Pat. No. 3,457,482. The second means in turn supports the output member such as the tool or stylus for movement with the second means.

Since all of the different members in the system constituting this invention are disposed in spaced relationship to one another, friction in the system has been minimized. This has allowed the weight of the various members in the system to be minimized. By minimizing friction and minimizing weight, the system has been provided with members of minimal dimensions so that, performance and visibility of the output member and accessibility to the output member have been enhanced.

In another embodiment of the invention, a plurality of spaced tracks are provided along the first coordinate axis. A plurality of first means such as reluctance motors are provided, each associated with a different track and each operative to drive the beam. The provision of a plurality of tracks has further tended to minimize the mass of the beam so that the accleration and speed of movement of the beam has been further enhanced. Since a plurality of first means are provided in this embodiment, the beam receives stresses at positions which are relatively close together so that distortions of the beam in the direction of the tracks are minimized. By minimizing the distortion of the beam, the positioning of the output member in the direction of the tracks can be accurately controlled. Furthermore, servo means may be provided for different ones of the first means in the plurality to control the movements of such first means in a manner to further reduce any non symmetrical stresses on the beam in the direction of the tracks. Hence, a thinner, lighter beam is caused to exhibit the characteristics which heretofore could be realized only by thick heavy beams.

In another embodiment of the invention, a pair of beams may be provided in a transverse and intersecting relationship to each other and motor means such as reluctance motors may be disposed at the intersecting relationship of the two beams to drive the beams, one beam along one coordinate axis and the other beam along the other coordinate axis. The motors are disposed relative to the beams so that the motor for driving each beam never engages the other beam in a frictional relationship.

Figures 1, 2, 3:
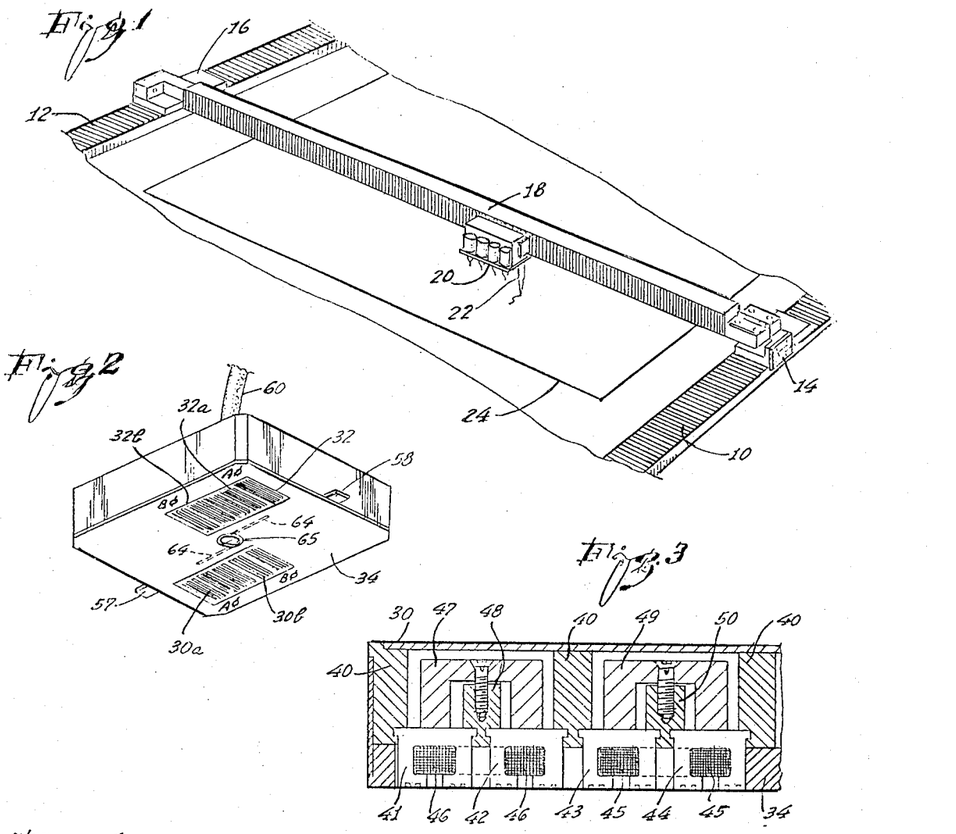
FIG. 1 is a perspective view of apparatus constituting one embodiment of the invention.
FIG. 2 is a perspective view of a driving means such as a head which may be used in the embodiment shown in FIG. 1.
FIG. 3 is a sectional view in elevation of the driving means shown in FIG. 2.

In the embodiment shown in FIG. 1, a pair of tracks 10 and 12 are disposed in spaced relationship to each other. The tracks 10 and 12 preferably extend along a first coordinate axis. A pair of driving means 14 and 16 such as heads are respectively disposed in spaced but contiguous relationship to the tracks 10 and 12. As will be described in detail subsequently, the driving means 14 and 16 respectively interact with the tracks 10 and 12 to move along the tracks on a controlled basis. Since the driving means 14 and 16 are spaced from their associated tracks, they move along the tracks with a minimum of friction with the tracks.

The driving means 14 and 16 support a beam 18 at opposite ends of the beam. Preferably the beam 18 is disposed along a second coordinate axis. Driving means 20 having a construction similar to the driving means 14 and 16 is disposed in spaced but contiguous relationship to the beam 18. The driving means 20 interacts with the beam 10 to move along the beam on a controlled basis with a minimum of friction between the driving means and the beam. The driving means 20 carries an output member 22 such as a stylus or a cutting tool.

When the driving means 14 and 16 become energized, they drive the beam 18 along the tracks 10 and 12. This provides a controlled positioning of the output member 22 along one coordinate axis such as the X-axis. Similarly, when the driving means 20 becomes energized, it drives the output member 22 along the other coordinate axis such as the Y-axis. In this way, the output member 22 can be moved to any desired position. When the output member 22 constitutes a stylus, it can provide markings on a paper 24 disposed below the stylus.

The driving means 14 and its associated track 10 effectively constitute a linear motor, the driving means 14 effectively constituting the rotor and the track 10 effectively constituting the stator. The driving means 16 and its associated track 12 and the driving means 20 and the associated beam 18 constitute similar linear motors. The linear motors may be constructed in different ways without departing from the scope of the invention. For example, the linear motors may constitute reluctance motors such as disclosed and claimed in U.S. Pat. No. 3,457,482. The linear motors may also be induction or hysteresis motors such as disclosed and claimed in U.S. Pat No. 3,735,231 issued to me on May 22, 1973. The linear motors may even be fluid motors such a disclosed and claimed in application Ser. No. 101,998 filed by me on or about Dec. 28, 1970.

When the linear motors constitute reluctance motors, they may be constructed in a manner similar to that shown in FIGS. 2, 3, 4 and 4a. For example, the linear motor formed from the track 10 and the driving means 14 may operate upon magnetic principles with the track 10 made from a ferromagnetic material and having grooves 23 at spaced positions to define magnetic teeth 24. In a typical structure, the grooves 23 are 0.020 inch wide and 0.020 inch deep and are spaced 0.040 inches apart between center lines. The spacing between the center lines of the grooves may be defined as the pitch of the grooves. The grooves may be left open with the air serving as a nonmagnetic material but it is preferred to fill the grooves with a plastic or other nonmagnetic solids to provide a smooth upper surface for the track 10. In effect, the teeth 24 and the grooves 23 define a grid structure.

The driving means includes a set of magnets 30a and 30b and a set of magnets 32a and 32b mounted in a housing or base 34 with the pole faces of the magnets at the surface of the base. Typically the base 34 may be an aluminum or plastic plate having two apertures for receiving the magnet sets. The magnet set 30a and 30b and the magnet set 32a and 32b are disposed substantially parallel to the track 10 and are used to propel and position the driving means 14 along the track.

Since the construction of the set of magnets 30a and 30b and the set of magnets 32a and 32b may be the same, one set will be described in detail. Each set may comprise two magnets and each magnet may have two pole pieces. The actuator or set of magnets 30a and 30b includes a frame 40 and pole pieces 41, 42, 43 and 44. Each of the pole pieces 41, 42, 43 and 44 may comprise a stack of lamination stampings. A winding 46 may be wound in magnetically coupled relationship to the pole pieces 41 and 42 and a winding 45 may be wound in magnetically coupled relationship to the pole pieces 43 and 44. A U-shaped magnet 47 including the pole pieces 41 and 42 is affixed to a rib 48 of the frame 40 as by a screw and a similar magnet 49 including the pole pieces 43 and 44 is affixed to a rib 50 of the frame 40. The frame 40 is made from a nonmagnetic material such as aluminum and, in the preferred embodiment, the magnets 47 and 49 are permanent magnets which provide a biasing or polarizing flux in the associated pole pieces.

The bottom face of each of the pole pieces 41 and 42 has teeth of magnetic material and preferably is provided with a plurality of teeth of the same width and spacing as the teeth 24 of magnetic material in the track 10. For example, the pole piece 41 may have a pair of teeth designated as *a* and *c* (FIG. 4) each of which has a width corresponding to the width of each of the teeth 24 and the grooves 23 in the track 10. Alternatively, each of the pole faces on the pole pieces 41 and 42 may comprise a plurality of spaced teeth as illustrated in FIG. 3.

Figure 4:
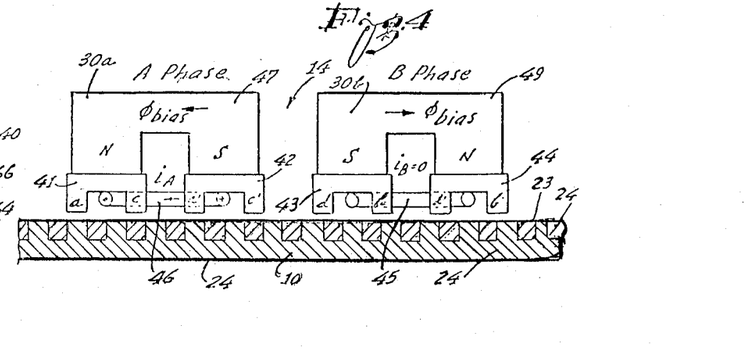
FIG. 4 is a view in elevation of the driving means and a view in section of a track included in the embodiment shown in FIG. 1, the driving means and the track cooperating to provide a movement of the driving means along the track.
Figure 4A:
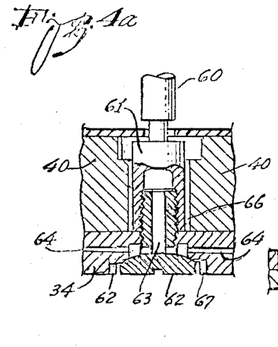
FIG. 4a is a sectional view in elevation of the driving means and illustrates the construction of an air bearing for maintaining the driving means in spaced but contiguous relationship to an associated member such as a track.

When the pole pieces 41 and 42 have the construction illustrated in FIG. 4, the teeth *a* and *c* are spaced such that, when one is over a tooth 24 of magnetic material on the track 10, the other is over the groove 23 of nonmagnetic material. In other words, the spacing between the center lines of the teeth *a* and *c* may be $p$ $(n \pm \frac{1}{2})$ where $n$ is any whole number and $p$ is the pitch of the grid on the track 10 or the distance from a center line of one groove or one tooth to the center line of the next groove or tooth on the track 10. The pole pieces 42, 43 and 44 are similarly constructed.

The pole piece 42 has magnet teeth designated as $a'$ and $c'$. The pole pieces 41 and 42 of the magnet 47 are spaced so that the magnetic teeth *a* and $a'$ are at magnetic teeth 24 at the same time and the magnetic teeth *c* and $c'$ are at magnetic teeth 24 at the same time. The magnet 49 is constructed in a manner similar to the magnet 47. The magnets 47 and 49 are spaced so that, when the teeth of one magnet are directly over a tooth or groove, the teeth of the other magnet are midway between a tooth and a groove. Thus, the center lines of corresponding teeth of the magnets 47 and 49 are spaced $p (n \pm \frac{1}{4})$.

The two magnets of a set are designated the A phase and B phase magnets. In the preferred embodiment, using two parallel sets of magnets as illustrated in FIG. 2, the magnets of one set such as the set 30 are arranged with the A phase to the left and the B phase to the right and the magnets of the other set such as the set 32 are arranged with the B phase to the left and the A phase to the right. This arrangement provides an improved balancing of forces on the driving means 14 and minimizes any tendency for the driving means 14 to rotate about an axis normal to the top surface of the track 10. With this arrangement, the magnets of one set are space $p (n \pm \frac{1}{4})$ and the magnets of the other set are spaced $p (n - \frac{1}{4})$.

In FIG. 4, when the current in the coil 46 for the magnet A is at full strength, the flux produced by the current is added to the bias flux produced by the permanent magnet 47 in the pole faces *a* and $a'$ and is subtracted from the bias flux produced by the magnet in the pole faces *c* and $c'$ to reduce the flux in the pole faces *c* and $c'$ to a value approximating zero. Since the teeth *a* and $a'$ are directly over the teeth 24 in the tracks 10, no force is produced by the teeth to move the driving means 14 along the track 10. At this time, the current $i_B$ in the coil 45 for the magnet 49 is zero and the fluxes in the teeth *d* and *b* of the pole piece 43 and in the teeth $d'$ and $b'$ of the pole piece 44 are substantially identical. The flux density is one-half of that produced by the magnet A through the teeth *a* and $a'$ in FIG. 4 and is one-fourth of that produced in the teeth *a* and $a'$ in FIG. 4 when the current $i_A$ flows through the coil 46. The *d* and $d'$ teeth are displaced from the *b* and $b'$ teeth by 180° so the net result is that the teeth *b* and $b'$ and the teeth *d* and $d'$ contribute no forces to move the driving means 14 along the track 10. Under these conditions, the driving means 14 remains in the position of FIG. 4.

In order to step the driving means 14 to the right, the B phase current is turned on with a polarity to cause the magnetic flux at *d* and $d'$ to go to zero and the flux at *b* and $d'$ to go to a maximum. When this occurs, a positive force is produced on the driving means 14 to move the driving means to the right in FIG. 4.

When the driving means 14 has advanced a quarter of a pitch, the B phase current may be turned off and the A phase current may be turned on with a polarity opposite to that shown in FIG. 4. The driving means 14 will then move to the right through a distance corresponding to another one fourth of a pitch so that the teeth *c* and $c'$ will be positioned over the teeth 24 of the track 10. For the next step, the A phase current may be turned off and the B phase current may be turned on with a polarity opposite to that described above. The next step is made by returning the current to the condition shown in FIG. 4. Stepping in the opposite direction is achieved by switching currents in the opposite sequence.

Actually both of the coils 46 and 45 in the phase A and phase B magnets may be simultaneously energized. The signals applied to the coils 46 and 45 may be periodic signals having a quadrature relationship to each other. For example, sine signals may be applied to the coil 46 and cosine signals may be applied to the coil 45. When this occurs, the movement of the driving means 14 may be continuous rather than occurring in steps as described in the previous paragraph. The direction of movement of the driving means 14 along the track 10 may be reversed by reversing the phase of one of the input signals such as the sine signal or by rotating the vector of the signals in the opposite direction.

The apparatus described above has certain important advantages. It provides a movement of an output member to any desired position with a minimum of friction between the members. Furthermore, since there is a minimum of friction between the members, the various members, and particularly the beam 18, can be fairly light. This allows the various members to respond quickly and to be accelerated rapidly and to be moved at a high speed and with precision from a first position to any desired position removed from the first position. The various parts of the apparatus are also easily accessible and the output member 22 such as the tool or stylus can be easily viewed.

Another advantage is that the driving means 20 carries the output member 22 so that the positioning of the output member is directly related to the positioning of the driving means. Still another advantage in the use of a reluctance motor is that the drive means are integral with the motor, thereby further reducing mass. Furthermore, the drive means and the motor do not include may friction elements, thereby providing extended life even at maximum performance levels. If desired, roller means may be provided to produce a support between the track 10 and the driving means 14.

The apparatus described above also has certain other important advantages. Since the coils 46 and 45 receive periodic signals which are related to the displacement of magnets 47 and 49 along the track 10, the displacement of the beam along the tracks 10 and 12 can be determined at each instant by determining the number of cycles and fractions thereof of the periodic signals applied to the coils 46 and 45. The displacement of the beam 18 along the tracks 10 and 12 can also be determined by providing magnetic pickoffs 57 and 58 which move with the beam and which produce signals during movements of the pickoffs past the teeth 24 and which fail to produce signals during movement of the pickoffs past the grooves 23. In this way, the pickoffs produce periodic signals where each periodic signal represents a displacement of the beam through a distance corresponding to the length of a tooth 24 and a groove 23. The displacement of the driving means 20 along the beam 18 can be determined in a manner similar to that described above.

Each of the driving means 14 and 16 has been described as including two sets of magnets such as the set of magnets 30a and 30b and the set of magnets 32a and 32b. Actually, the driving means 14 may constitute one set of magnets such as the magnets 30a and 30b and the driving means 16 may constitute the other set of magnets such as the magnets 32a and 32b. Such an arrangement would be effective in driving the beam 18 while still preventing rotation of the beam.

As previously described, the driving means 14 is disposed in spaced but contiguous relationship to the track 10. Various means including air bearings may be used to provide such spacing. For example, a control line 60 may constitute (FIG. 4a) a conduit for a supply of air under pressure. The air conduit of the control line terminates on a tube 61 held in place by a screw 66 positioned in an aperture 62. A passage 63 in the screw 66 provides communication with passages 64 radiating outwardly from the screw and terminating in outlet openings 65 (FIG. 2).

The description has proceeded on the basis that the driving means 14 and 16 constitute motors for driving the beam 18 along the tracks 10 and 12 and that the driving means 20 constitute a motor for driving the output member 22 along the beam 18. It should be appreciated, however, that the invention contemplates a system where the beam 18 can be moved by other means or even manually along the tracks 10 and 12 and that the output member 22 can be positioned by other means or even manually along the beam 18. Under such circumstances, the apparatus similar to that described above operates as a reckoner for indicating the displacement of the output member 22 along the pair of coordinate axes such as the X- and Y- axes.

If the beam 18 is relatively long, there is a tendency for the beam to become deflected as it is accelerated. Any such tendency can be reduced by making the beam fairly heavy but this would tend to reduce the acceleration which can be imparted to the various members including the beam. Furthermore, even if the mass of the beam should be increased somewhat, there would still be some tendency for the beam to be deflected. As will be appreciated, any deflection of the beam tends to produce errors in the positioning of the driving means 20 and the output member 22 in the direction along the lengths of the tracks 10.

Figure 5:
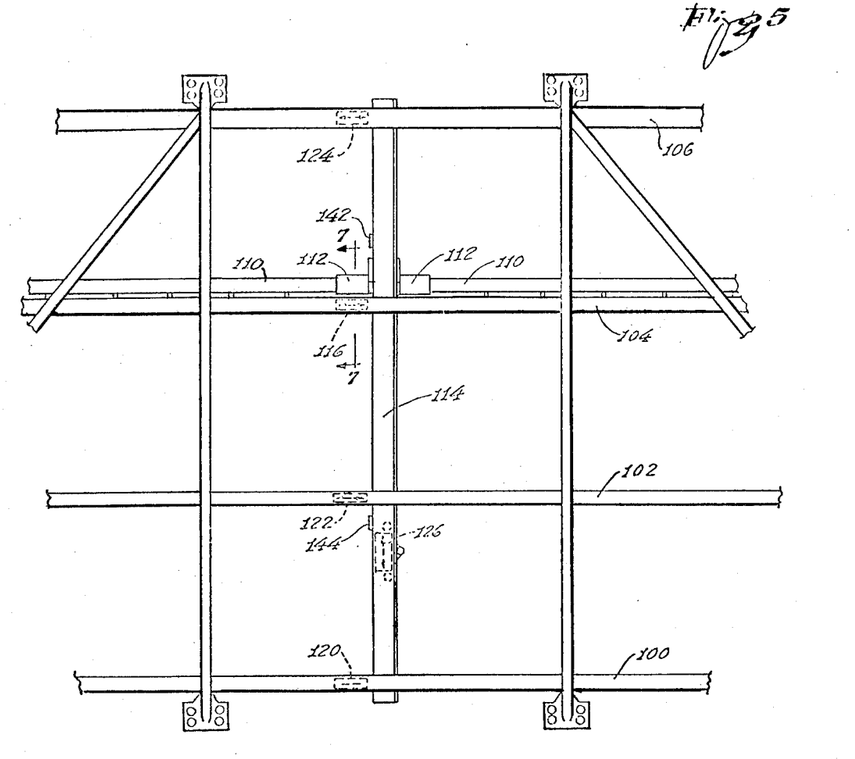
FIG. 5 is a plan view of a second embodiment of the invention.
Figure 6:
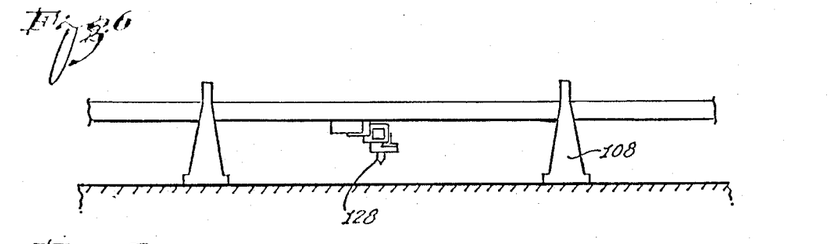
FIG. 6 is a front elevational view of the embodiment shown in FIG. 5.
Figure 7:
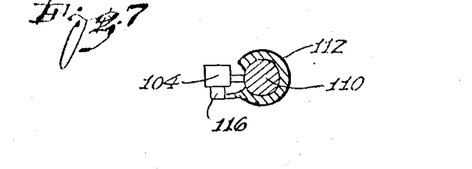
FIG. 7 is a sectional view substantially on the line 7 — 7 of FIG. 5.

The embodiment shown in FIGS. 5, 6 and 7 tends to minimize any deflection of the beam corresponding to the beam 18 in FIG. 1. In the embodiment shown in FIGS. 5, 6 and 7, a plurality of tracks such as tracks 100, 102, 104 and 106 are provided in spaced relationship to one another. The tracks 100, 102, 104 and 106 are preferably disposed along a particular one of the axes such as the X- axis. The tracks 100, 102, 104 and 106 may be supported by stanchions such as stanchions 108. Although four tracks are shown in the embodiment of FIGS. 5, 6 and 7, any number of tracks greater than two can be used without departing from the scope of the invention.

Each of the tracks 100, 102, 104 and 106 may be provided with an arrangement such as that shown for the track 104. As illustrated in FIG. 7, shaft 110 is fixedly attached to the track 104. Journals 112 are disposed around the shaft 110 and are attached to a beam 114 on opposite sides of the beam. The journals 112 are also attached to driving means 116 which may correspond in construction to the driving means 14 in FIG. 1.

In like manner, driving means 120, 122 and 124 are respectively associated with the tracks 100, 102 and 106 and are operatively coupled to the beam 114 to drive the beam. The driving means 116, 120, 122 and 124 receive similar signals to displace the beam 114 along their associated tracks. Driving means 126 corresponding to the driving means 20 in FIG. 1 are associated with the beam 114 to move along the beam in accordance with the selective energizing of the driving means 126. The driving means 126 carry an output member such as a tool or stylus.

Figures 8, 9, 10:
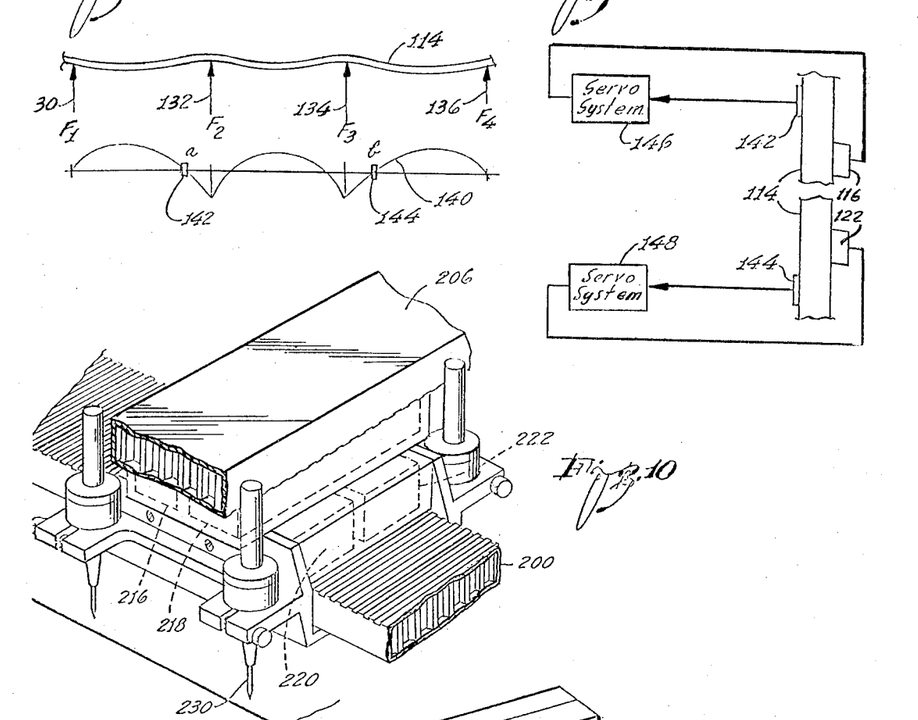
FIG. 8 is a schematic diagram of the stresses imposed on one of the members such as a movable beam included in the embodiment shown in FIGS. 5, 6 and 7.
FIG. 9 is a schematic diagram of servo systems used with the embodiment shown in FIGS. 5, 6 and 7 to equalize the stresses schematically illustrated in FIG. 8.
FIG. 10 is a fragmentary perspective view of apparatus included in a third embodiment of the invention.

As will be appreciated, the driving means 116, 120, 122 and 124 produce forces which create stresses in the beam 114. The forces are respectively indicated at 130, 132, 134 and 136 and a plot of the stress in the outer fibers of the beam 114 is also shown in FIG. 8. The stresses tend to distort the beam so that the beam may have a configuration corresponding to that indicated on an exaggerated basis in FIG. 8. As will be seen, the stress of the beam 114 in the pattern 140 is zero at several positions along the length of the beam including positions a and b.

Various systems may be provided for minimizing the stresses imposed upon the beam 114 at various positions along the beam. One system involves the operation of the driving means 120 and 124 on an open loop basis so that the forces 130 and 136 at the positions of the driving means 120 and 124 naturally seek equality and establish the baseline of the beam 114. The system also includes the positioning of strain gage pickoffs 142 and 144 at the positions a and b in FIG. 8 where the stress on the beam 114 is zero when the beam is optimally stressed. The stresses sensed by the pickoff 142 may be servoed by a system 146 in FIG. 9 to produce a force which is applied to the beam 114 at a position along the length of the beam corresponding to the position of the driving means 116. The force is applied to the beam through the drive means or motor 110 in FIG. 5 in a direction and with a magnitude to tend to reduce the stress at the position a in FIG. 8 to zero. In like manner, the stresses imposed on the pickoff 144 may be servoed by a system 148 in FIG. 9 to produce a force which is applied to the beam through the drive means or motor 122 in FIG. 5. The force is applied to the beam in a direction and with a magnitude to reduce the stress at the position b in FIG. 9 to zero. By servoing the stresses at the positions a and b in FIG. 8 so that such stresses tend toward zero, the pattern of stresses along the beam may be maintained in accordance with the curve 140 in FIG. 8.

Other systems may be employed to synchronize the operation of the driving means 116, 120, 122 and 124. For example, a laser beam may be directed parallel to the beam 114 and a set of sensors may be disposed at spaced positions along the beam to detect errors in the positioning of the beam 114 from a static ten base line. These errors may be converted to forces which are applied to the beam 114 to nullify such errors.

Another embodiment may include a taut metal tape stretched parallel to the beam 14 and terminated at the ends of the traveling beam. Pickoffs such as electromagnetic, optical or capacitive pickoffs may be used to provide error outputs from the tape reference base line. These error outputs are used to control the production of forces which are applied to the beam to reduce the error outputs.

In another embodiment, a force pickoff may be disposed at each of the driving means 116, 120, 122 and 124 to measure the forces applied to the beam at these positions. The pickoff signals are used to accurately maintain the proper force scale factor at the position of each motor. This is because the forces are not all equal but have precise ratios between them depending on the number of said forces. In still another embodiment, an accelerometer may be disposed at the position of each of the driving means 116, 120, 122 and 124 and a servo system may be provided to equalize the accelerations at such different positions.

The apparatus shown in FIGS. 5, 6 and 7 and described above has all of the advnatages previously described in detail for the apparatus shown in FIGS. 1, 2, 3, 4 and 4a. The apparatus shown in FIG. 5, 6 and 7 and described above is further advantageous in that it more uniformly distributes stresses on the beam such as the beam 114 and insures proper movement along the tracks of the beam at different positions along the beam. The apparatus also provides the advantage of a continuous (multi-support)beam with a colinear base line to a moving beam mechanism, thus reducing the maximum deflection under acceleration normal to the beam. In this way, the apparatus simulates a shortened simple beam.

By supporting the beam at a plurality of spaced positions and insuring the proper movement of the beam at the different positions along the beam, the mass of the beam can be minimized. This insures that the beam can be accelerated quickly and can be moved at a high velocity without sacrificing any accuracy in the displacement of the beam.

The apparatus has been illustrated and described primarily as controlling the displacement of an output member such as a cutting tool or stylus to any position defined by X- and Y-coordinates or axes. It will be appreciated, however, that the apparatus can be used with any other type of coordinates without departing from the scope of the invention. For example, apparatus constructed in a manner similar to that described above can be used to displace an output member such as a stylus or a cutting tool along polar or spherical coordinates without departing from the scope of the invention.

The embodiment shown in FIG. 10 generally operates on the principles described above. The embodiment includes a first beam 200 movable along a first coordinate axis such as the X-axis and disposed along a second coordinate axis such as the Y-axis. A pair of drive means 202 and 204 are coupled to the beam 200 at the opposite ends of the beam to drive the beam along the X-axis. The drive means 202 and 204 are disposed in contiguous relationship to tracks 205 which extend along the X-axis. The drive means 202 and 204 may be constructed in a manner similar to that described above for the drive means 14 and 16 in FIG. 1.

A second beam 206 is movable along a second coordinate axis such as the Y-axis and is disposed along the first coordinate axis such as the X-axis. A pair of drive means 210 and 212 are coupled to the beam 206 at opposite ends of the beam. The drive means 210 and 212 are disposed in contiguous relationship to tracks 214 which extend along the Y-axis. The drive means 210 and 212 may be constructed in a manner similar to that described above for the drive means 14 and 16.

A pair of drive means 216 and 218 are disposed along the beam 206 in symmetrical relationship to the beam 200. The drive means 216 and 218 are mechanically coupled to each other for a coordinated movement. The drive means 216 and 218 cooperate with the beam 206 in a manner similar to that described above for the beam 10 and the drive means 14 to provide for a coordinated movement of the drive means along the beam when the drive means are selectively energized. The drive means 216 and 218 are disposed relative to the beams 200 and 206 so that they are free to move without engaging the beams.

A pair of drive means 220 and 222 are disposed along the beam 200 in symmetrical relationship to the beam. The drive means 220 and 222 are mechanically coupled to each other and to the drive means 216 and 218 for a coordinated movement of such drive means. The drive means 220 and 222 cooperate with the beam 200 in a manner similar to that described above for the beam 10 and the drive means 14 to provide for a coordinated movement of the drive means along the beam when the drive means are selectively energized. The drive means 220 and 222 are disposed relative to the beams 200 and 206 so that they are free to move without engaging the beams.

The drive means 202, 204, 220 and 222 simultaneously receive signals for selectively energizing the drive means. The drive means 202, 204, 220 and 222 simultaneously receive signals. The drive means 202 and 204 drive the beam 200 such that the drive means 220 and 222 and the drive means 216 and 218 move along the beam 206 in synchronized movement with the beam 200. Similarly, the drive means 210, 212, 216 and 218 simultaneously receive signals for selectively energizing the drive means. The drive means 210 and 212 drive the beam 206 such that the drive means 216 and 218 and the drive means 220 and 222 move along the beam 200 in synchronized movement with the beam 206. The drive means 216, 218, 220 and 222 may be provided with pickoff means in a manner similar to that described above.

An output member 230 such as a stylus or cutter is mechanically coupled to the drive means 216, 218, 220 and 222 to move with such drive means. Actually, a plurality of output members may be provided as shown in FIG. 10 and the output members may be selectively activated at each instant in accordance with the output desired. Since the drive means 216, 218, 220 and 222 are disposed relative to the beams 200 and 206 so that they are free to move without engaging the beams, the output member 230 also has such a free movement.

Figure 11:
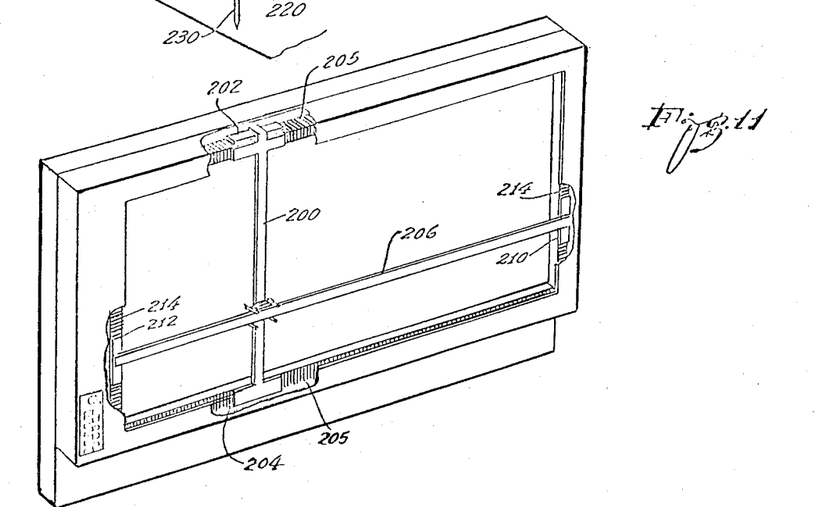
FIG. 11 is a perspective view of the third embodiment shown in FIG. 10.

The apparatus described above has certain important advantages. For example, the beams 200 and 206 can bend without appreciably affecting the positioning of the mechanism formed by the drive means 216, 218, 220 and 222 and the output member 230 since this mechanism is floating relative to the beam. In effect, the mechanism formed by the drive means 216, 218, 220 and 222 and the output member 230 constitutes a stiff mechanism such that the output member 230 can be accurately positioned regardless of any bending of the beams 200 and 206. Since the mechanism formed by the drive means 216, 218, 220 and 222 and the output member 230 is stiff, it can be provided with accelerations of considerable magnitude and with high velocities without sacrificing any accuracies in the displacement or positioning of the output member 230. In addition to the advantages described in this paragraph, the embodiment shown in FIGS. 10 and 11 has all of the advantages described above for the previous embodiments.

Although this application has been disclosed and illustrated with reference to particular applications, the principles involved are susceptible of numerous other applications which will be apparent to persons skilled in the art. The invention is, therefore, to be limited only as indicated by the scope of the appended claims.

I claim:

1. In a system for providing a controlled movement of an output member along first and second coordinate axes, the combination of:
   at least a pair of tracks disposed in spaced relationship to each other,
   a beam disposed in spaced and perpendicular relationship to the tracks and disposed between the tracks and movable along the tracks in the spaced and perpendicular relationship to the tracks,
   first motor means disposed on the beam in spaced but cooperative relationship with one of the tracks for cooperating with that track to produce with that track a motor for providing a controlled movement of the beam along that track in the spaced and perpendicular relationship to the track, and
   second motor means disposed on the beam in spaced but cooperative relationship with the other one of the tracks for cooperating with that track to produce with that track a motor for providing a controlled movement of the beam along that track in the spaced and perpendicular relationship to that track,
   the first and second motor means being constructed to receive first polyphase signals and being disposed relative to their associated tracks to provide identical displacements of the beam relative to the tracks at the opposite ends without any rotation of the beam relative to the tracks,
   third motor means disposed on the beam in spaced but cooperative relationship with the beam and supporting the output member and cooperating with the beam to produce with the beam a motor for providing a controlled movement of such second means along the beam in the spaced but cooperative relationship with the beam and for providing a movement of the output member with such means,
   first signal means operatively coupled to the first and second motor means for introducing the first polyphase signals to the first and second motor means to energize the first and second motor means, and
   second signal means operatively coupled to the third motor means for introducing second polyphase signals to the third motor means to energize the third motor means.

2. In the system set forth in claim 1,
   each track being constructed to define a grid, the first and second motor means having a plurality of members displaced in phase relative to one another and to the grids on the tracks and energizable in a particular sequence by the first polyphase signals to provide a controlled movement of the beam along the tracks and the beam being constructed to define a grid and the third motor means having a plurality of members displaced in phase relative to one another and to the grid on the beam and being energizable in a particular sequence by the second polyphase signals to provide a controlled movement of the output member along the beam.

3. In the system set forth in claim 1,
   each of the tracks in the pair defining a grid structure and the first motor means and the second motor means having elements for interacting with the grid structure of the associated tracks to define motors for providing a displacement of the first and second motor means and the beam along the tracks, the elements in the first motor means being displaced in phase relative to each other and to the grid structure of the associated track and the elements in the second motor means being displaced in phase relative to each other and to the grid structure of the associated track to provide for the controlled displacement of the first and second motor means and the beam along the tracks in accordance with the introduction of the first polyphase signals,
   the beam defining a grid structure and the third motor means having elements for interacting with the grid structure of the beam to define a motor for providing a displacement of the third motor means and the output member along the beam, the elements in the third motor means being displaced in phase relative to each other and to the grid structure of the beam to provide for the controlled displacement of the third motor means and the output member along the beam in accordance with the introduction of the second polyphase signals.

4. In the system set forth in claim 3,
   the tracks having magnetic characteristics and the first and second motor means having magnetic characteristics for interacting with the tracks to produce a force for displacement of the first and second motor means and the beam along the tracks and the beam having magnetic characteristics and the third means having magnetic characteristics for interacting with the beam to produce a force for displacement of the second means and the output member along the beam.

5. In a system for providing a controlled movement of an output member along first and second coordinate axes, the combination of:
   at least a pair of tracks disposed in spaced relationship to each other,
   a beam disposed in spaced and perpendicular relationship to the tracks and disposed between the tracks and movable along the tracks in the spaced relationship to the tracks,
   first means disposed in spaced but cooperative relationship with one of the tracks and operatively coupled to the beam and defining a motor with that track and energizable to drive the beam along the track in the spaced relationship to the track in accordance with such energizing, second means disposed in spaced but cooperative relationship to one of the tracks and cooperatively coupled to the beam and defining a motor with that track and energizable to drive the beam along the track in the spaced relationship to the track in accordance with such energizing, the first and second means being constructed and disposed relative to their associated tracks to provide substantially identical displacements of the first and second means along their associated tracks to maintain the beam in perpendicular relationship to the tracks, third means operatively coupled to the output member and disposed in spaced but cooperative relationship with the beam and defining a motor with the beam and energizable to drive the output member along the beam in the spaced relationship to the beam in accordance with such energizing, fourth means for introducing first polyphase signals to the first and second means to provide an energizing of the first and second means for driving the beam along the tracks, and fifth means for introducing second polyphase signals to the third means to provide an energizing of the third means for driving the output member along the beam.

6. In the system set forth in claim 5, the first means being interactive with its associated track for determining the position of the beam relative to the track while driving the beam along the track and the second means being interactive with its associated track for determining the position of the beam relative to the track while driving the beam along the track and the third means being interactive with the beam for determining the position of the output member along the beam while driving the output member along the beam.

7. In the system set forth in claim 5, the tracks being in the form of magnetic grids and the first means being constructed with magnetic properties for cooperation with the magnetic grid on its associated track and provided with a plurality of elements displaced in phase in a particular relationship to the grid and to one another and energizable by the first polyphase signals in a particular sequence to provide displacements of the beam along the tracks and the second means being constructed with magnetic properties for cooperation with the magnetic grid on its associated tracks and provided with a plurality of elements displaced in phase in a particular relationship to the grid and to one another and energizable by the first polyphase signals in a particular sequence and the beam being in the form of a magnetic grid and the third means being constructed with magnetic properties for cooperation with the magnetic grid on the beam and provided with a plurality of elements displaced in phase in a particular relationship to the grid and to one another and energizable by the second polyphase signals in a particular sequence to provide displacements of the output member along the beam.

8. In a system for providing a controlled movement of an output member along first and second coordinate axes, the combination of:

at least a pair of tracks disposed in spaced and parallel relationship to each other, a beam disposed between the tracks in contiguous and perpendicular relationship to the tracks and disposed between the tracks for independent displacement along the tracks in such contiguous and perpendicular relationship, a plurality of first means provided on the tracks at spaced positions along the tracks to define a grid, second means disposed in spaced but contiguous relationship to one of the tracks and in operatively coupled relationship to one end of the beam to drive the beam, the second means having a plurality of elements displaced in phase in a particular relationship to the first means on that track and energizable by first polyphase signals in a particular sequence and cooperative with the first means, when energized, for interacting with the first means to produce arbitrary displacements between the first means and the second means along the track in such contiguous relationship, third means disposed in spaced but contiguous relationship to the other one of the tracks and in operatively coupled relationship to the other end of the beam to drive the beam, the third means having a plurality of elements displaced in phase in a particular relationship to the first means in that track and energizable by the first polyphase signals in the particular sequence and cooperative with the first means, when energized, for interacting with the first means to produce arbitrary displacements between the first means and the third means along the track in such contiguous relationship, the second and third means being constructed and disposed relative to their associated tracks to provide substantially identical displacements of the second and third means along their associated tracks to maintain the beam in perpendicular relationship to the tracks, a plurality of fourth means provided on the beam at spaced positions along the beam to define a grid, fifth means provided in spaced but contiguous relationship to the beam and in operatively coupled relationship to the output member, the fifth means having a plurality of elements displaced in phase in a particular relationship to the fourth means on the beam and energizable by second polyphase signals in a particular sequence and cooperative with the fourth means, when energized, for interacting with the fourth means to produce arbitrary displacements between the third means and the fourth means along the beam in such contiguous relationship, sixth means for introducing the first polyphase signals to the second and third means to energize the pluralities of elements in the second and third means in the particular sequence, and seventh means for introducing the second polyphase signals to the fifth means to energize the plurality of elements in the fifth means in the particular sequence.

9. In the system set forth in claim 8, the beam being adjustable relative to the tracks to compensate for differences in the relative positions of the tracks.

10. In the system set forth in claim 9, the first means having magnetic characteristics and the second means having magnetic characteristics for interacting with the first means on the associated track to produce a force for displacements between the first means and the second means along the tracks in accordance with the phase characteristics of the first polyphase signals and the third means having magnetic characteristics for interacting with the first means on the associated track to produce a force for displacements between the first means and third means along the tracks in accordance with the characteristics of the first polyphase signals and the fourth means having magnetic characteristics and the fifth means having magnetic characteristics for interacting with the fourth means to produce a force for displacements between the fourth means and the fifth means along the beam in accordance with the phase characteristics of the second polyphase signals.

11. In a system for providing a controlled movement of an output member along first and second coordinate axes, the combination of:
  a pair of tracks disposed in spaced relationship to each other,
  a beam spaced from the tracks and disposed in spaced and contiguous and perpendicular relationship to the tracks and disposed between the tracks and movable along the tracks and including first means disposed at one end of the beam and defining a motor with one of the tracks for producing an interaction with that track in accordance with the introduction of first polyphase signals to the first means to drive the beam along the track in such spaced and contiguous and perpendicular relationship and for simultaneously obtaining a determination of the position of the beam along the track and further including second means disposed at the other end of the beam and defining a motor with the other track for producing an interaction with such other track to drive such beam along such other track in such contiguous and perpendicular relationship in accordance with the introduction of the first polyphase signals to the second means and for simultaneously obtaining a determination of the beam along such other track,
  the first and second means being constructed to receive the first polyphase signals and being disposed relative to their associated tracks to simultaneously and indentically energize the motors defined by the first and second means and the pair of tracks and to provide substantially identical displacements of the beam along the associated tracks and thereby maintain the beam in perpendicular relationship to the tracks,
  third means movable along the beam and disposed in spaced but contiguous relationship to the beam and coupled to the output member and defining a motor with the beam for providing an interaction with the beam to drive the output member along the tracks in such spaced but contiguous relationship in accordance with the introduction of second polyphase signals to the third means and for simultaneously obtaining a determination of the position of the output member along the beam,
  fourth means for introducing the first polyphase signals to the first and second means to produce a simultaneous and identical energizing of the first and second means for driving the beam along the tracks in perpendicular relationship to the tracks, and
  fifth means for introducing the second polyphase signals to the third means to produce an energizing of the third means for driving the output member along the tracks.

12. In the system set forth in claim 11,
  the tracks being in the form of grids and the first and second means being provided with magnetic properties and being disposed in cooperative relationship with the grids on the respective tracks to provide arbitrary movements of the first and the second means and the beam along the tracks and the beam being in the form of a grid and the third means being provided with magnetic properties and being disposed in cooperative relationship with the grid on the beam to provide arbitrary movements of the third means and the output member along the beam.

13. In a system for providing a controlled movement of an output member along first and second coordinate axes, the combination of:
  at least a pair of tracks disposed in spaced relationship to each other,
  a beam disposed between the tracks in perpendicular relationship to the tracks and in contiguous but displaced relationship to the tracks for movement along the tracks in such perpendicular and contiguous but displaced relationship to the tracks,
  first means supported by the beam in contiguous but displaced relationship to one of the tracks and defining a motor with that track for interacting with that track to produce an independent movement of the beam along that track in accordance with the introduction of first polyphase signals to the first means,
  second means supported by the beam in contiguous but displaced relationship to the other one of the tracks and defining a motor with such other track for interacting with that track to produce an independent movement of the beam along that track in accordance with the introduction of the first polyphase signals to the second means,
  the first and second means having constructed to receive the first polyphase signals for energizing the first and second means and being disposed relative to their associated tracks to obtain simultaneous and identical movements of the beam along the first and second tracks in accordance with the introduction of the first polyphase signals and to maintain the beam in perpendicular relationship to the tracks,
  third means disposed in contiguous but displaced relationship to the beam and coupled to the output member and defining a motor with the beam for interacting with the beam to produce an independent movement of the output member along the beam in such contiguous but displaced relationship in accordance with the introduction of second polyphase signals to the third means,
  fourth means disposed on the beam and included in the first means and cooperative with the associated track for maintaining the beam in contiguous but displaced relationship to the track,
  fifth means disposed on the beam and included in the second means and cooperative with the associated track for maintaining the beam in contiguous but displaced relationship to such track, sixth means included in the third means and cooperative with the beam for maintaining the third means in contiguous but displaced relationship to the beam, seventh means for introducing the first polyphase signals to the first and second means to produce simultaneous and identical movements of the first and second means along their associated tracks, and eighth means for introducing the second polyphase signals to the third means to produce a movement of the third means along the beam.

14. In the system set forth in claim 13, the fourth, fifth and sixth means constituting hydrostatic air bearings.

15. In the system set forth in claim 13,
the first and second means being energizable and being cooperative with the associated tracks to provide a determination of the position of the first and second means and the beam along the associated tracks and the third means being energizable and being cooperative with the beam to provide a determination of the position of the third means and the output member along the beam.

16. In a system for providing a controlled indication of displacement of an output member along first and second coordinate axes, the combination of:
at least a pair of tracks disposed in spaced relationship to each other,
a beam disposed between the tracks in spaced and perpendicular relationship to the tracks and movable along the tracks in the spaced and perpendicular relationship to the tracks,
first means operatively coupled to the beam for movement with the beam and disposed in spaced but contiguous relationship to one of the tracks and cooperative with that track to define a reluctance motor with the track for producing an interaction between the first means and the track in accordance with the introduction of first polyphase signals to the first means to provide a displacement of the beam and the first means along the track, and
second means operatively coupled to the beam for movement with the beam and disposed in spaced but contiguous relationship to the other one of the tracks and cooperative with that track to define a reluctance motor with that track for producing an interaction between the second means and the track in accordance with the introduction of the first polyphase signals to the second means to provide a displacement of the beam and the second means along that track, and
the first and second means being constructed and being disposed relative to their associated tracks to provide substantially identical displacements of the first and second means along their associated tracks and to maintain the output member in perpendicular relationship to the tracks, and
third means operatively coupled to the output member and disposed in spaced but contiguous relationship to the beam and cooperative with the beam to define a reluctance motor with the beam for producing an interaction between the second means and the beam in accordance with the introduction of second polyphase signals to the third means to provide a displacement of the third means and the output member along the beam, fourth means for introducing the first polyphase signals to the first and second means to produce identical displacements of the first and second means along their associated tracks in accordance with the characteristics of the first polyphase signals, and fifth means for introducing the second polyphase signals to the third means to produce a displacement of the third means along the beam in accordance with the characteristics of the second polyphase signals.

17. In the system set forth in claim 16,
the tracks having magnetic properties and the first means being provided with magnetic properties for cooperating with the associated track to define a magnetic reluctance motor and the second means being provided with magnetic properties for cooperating with the associated track to define a magnetic reluctance motor and the beam having magnetic properties and the third means being provided with magnetic properties for cooperating with the beam to define a magnetic reluctance motor.

18. In the system set forth in claim 17,
the tracks defining a magnetic grid and the first means having a plurality of elements displaced by a particular phase relationship from one another and from the grids on the tracks with properties of becoming energized in a particular sequence in accordance with the introduction of the first polyphase signals to the elements and of producing magnetic lines of force, when energized, for driving the first means along its associated track and the second means having a plurality of elements displaced by a particular phase relationship from one another and from the grids on the track with properties of becoming energized in a particular sequence in accordance with the introduction of the first polyphase signals to the elements and of producing magnetic lines of force, when energized, for driving the second means along its associated track and the third means having a plurality of elements displaced by a particular phase relationship from one another and from the grids on the beam with properties of becoming energized in a particular sequence in accordance with the introduction of the second polyphase signals to the elements and of producing magnetic lines of force, when energized, for driving the third means along the beam.

19. In the system set forth in claim 18,
the grids on the tracks and on the beam being magnetic and the first and second means including permanent magnets and magnetic elements disposed in contiguous relationship to the grids on the tracks and including windings on the magnetic elements and the magnetic elements being magnetized by the permanent magnets and by the fluxes produced by currents flowing through the windings in accordance with the introduction of the first polyphase signals to the first and second means and the grids on the tracks being magnetized in accordance with the magnetizing of the magnetic elements and the third means including permanent magnets and magnetic elements disposed in contiguous relationship to the grid on the beam and including windings on the magnetic elements and the magnetic elements in the third means being magnetized by the permanent magnets in the third means and by the fluxes produced by currents flowing through the windings in accordance with the introduction of the second polyphase signals to the third means and the grid on the beam being magnetized in accordance with the magnetizing of the magnetic elements in the third means.

20. In a system for providing a controlled movement of an output member along first and second coordinate axes, the combination of:
a plurality of tracks disposed in spaced relationship to one another,
a beam disposed between the tracks in spaced and perpendicular relationship to the tracks and movable along the tracks in the spaced and perpendicular relationship to the tracks,
a plurality of first means each disposed on the beam in cooperative relationship with an individual one of the tracks in the plurality and defining a motor with the individual track for providing a controlled movement of the beam along the individual track in the spaced and perpendicular relationship to the individual track, each of the first means being constructed to simultaneously receive first polyphase signals to provide the controlled movement of the beam along the individual tracks,
the first means in the plurality being constructed and disposed relative to their associated tracks to provide substantially identical displacements of the first means along their associated tracks in accordance with the introduction of the first polyphase signals and to maintain the beam in perpendicular relationship to the tracks,
second means disposed on the beam is spaced but cooperative relationship with the beam and supporting the output member and defining a motor with the beam for providing a controlled movement of such means along the beam in spaced relationship with the beam in accordance with the introduction of second polyphase signals to the second means and for providing a movement of the output member with such means,
third means for introducing the first polyphase signals to the first means in the plurality to produce the controlled movements of the beam along the tracks in perpendicular relationship to the tracks,
fourth means for introducing the second polyphase signals to the second means to obtain the controlled movement of the output member along the beam,
fifth means disposed at particular positions on the beam for determining the stress on the beam at such positions, and
sixth means responsive to the stresses indicated by the fifth means for adjusting the forces produced by the individual ones of the first means on the beam at the associated ones of the tracks to provide particular stresses on the beam at the particular positions to maintain the beam in perpendicular relationship to the tracks.

21. In the system set forth in claim 20,
each of the tracks in the plurality defining a grid structure and each of the first means having a plurality of elements for interacting with the grid structure of the associated track to provide a displacement of each of the first means and the beam along the associated track, the elements in each of the first means being displaced in phase in a particular relationship to each other and the grid structure of the associated track to provide for the displacement of the first means and the beam along the track in accordance with the introduction of the first polyphase signals to the first means,
the beam defining a grid structure and the second means having a plurality of elements for interacting with the grid structure of the beam to provide a displacement of the second means along the beam, the elements in the second means being displaced in phase in a particular relationship to each other and to the grid to provide for the displacement of the second means along the beam in accordance with the introduction of the second polyphase signals to the second means.

22. In the system set forth in claim 21,
the tracks having magnetic characteristics and each of the first means having magnetic characteristics for interacting with the associated track to produce a force for displacement of the first means and the beam along the track in accordance with the introduction of the first polyphase signals to the first means and the beam having magnetic characteristics and the second means having magnetic characteristics for interacting with the beam to produce a force for displacement of the second means along the beam in accordance with the introduction of the second polyphase signals to the second means.

23. In a system for providing a controlled movement of an output member along first and second coordinate axes, the combination of:
at least a first pair of tracks disposed in spaced relationship to each other along a first coordinate axis,
a first beam disposed between the first pair of tracks in spaced and perpendicular relationship to the first tracks and movable along the tracks in the spaced and perpendicular relationship to the tracks,
first means disposed in spaced relationship to the first tracks and operatively coupled to the first beam and defining motors with the tracks when energized to drive the beam along the tracks in accordance with the introduction of first polyphase signals to the first means to produce such energizing,
at least a second pair of tracks disposed in spaced relationship to each other along a second coordinate axis and in perpendicular relationship to the first tracks,
a second beam disposed between the second pair of tracks in spaced and perpendicular relationship to the second tracks and movable along the second tracks in the spaced and perpendicular relationship to the tracks and disposed in crossing and perpendicular relationship with the first beam,
seocnd means disposed in spaced relationship to the second tracks and operatively coupled to the second beam and defining motors with the second tracks when energized to drive the second beam along the second tracks in accordance with the introduction of second polyphase signals to the second means to produce such energizing,
third means disposed in spaced relationship with the first beam at a position adjacent to the crossing relationship between the first and second beams and operatively coupled to the output member and defining a motor with the first beam when energized in accordance with the introduction of the second polyphase signals to the third means to produce such energizing, fourth means disposed in spaced relationship with the second beam at a position adjacent to the crossing relationship between the first and second beams and operatively coupled to the output member and defining a motor with the second beam when energized in accordance with the introduction of the first polyphase signals in the fourth means to produce such energizing, fifth means for introducing the first polyphase signals to the first and fourth means to drive the first beam along the first pair of tracks and the output member along the second beam on a synchronized basis, and sixth means for introducing the second polyphase signals to the second and third means to drive the second beam along the second pair of tracks and the output member along the first beam on a synchronized basis.

24. In the system set forth in claim 23, the third means being interactive with the first beam for determining the position of the output member along the first coordinate axis and the fourth means being interactive with the second beam for determining the position of the output member along the second coordinate axis.

25. In the system set forth in claim 24, the first tracks being in the form of magnetic grids and the first means being constructed with magnetic properties when energized by the first polyphase signals for cooperation with the grids on the first tracks to provide displacement of the first beam along the first tracks in accordance with such energizing and the second tracks being in the form of magnetic grids and the second means being constructed with magnetic properties when energized by the second polyphase signals for cooperation with the grids on the second tracks to provide displacement of the second beam along the second tracks in accordance with such energizing.

26. In the system set forth in claim 24, the first beam being in the form of a magnetic grid and the third means being constructed with magnetic properties when energized by the second polyphase signals for cooperation with the grid on the first beam to provide displacement of the third means in accordance with such energizing and the second means being in the form of a magnetic grid and the fourth means being constructed with magnetic properties when energized by the first polyphase signals for cooperation with the grid on the second beam to provide displacement of the fourth means in accordance with such energizing.

27. In a system for providing a controlled movement of an output member along first and second coordinate axes having a perpendicular relationship to each other, the combination of:

at least a first pair of tracks disposed in spaced relationship to each other along the first coordinate axis, a first beam disposed between the first pair of tracks in spaced and perpendicular relationship to the first pair of tracks and movable along the tracks in the spaced and perpendicular relationship to the tracks, at least a second pair of tracks disposed in spaced relationship to each other along the second coordinate axis, a second beam disposed between the second pair of tracks in spaced and perpendicular relationship to the second pair of tracks and in intersecting relationship with the first beam and movable along the tracks in the spaced and perpendicular relationship to the tracks, first means disposed on the first beam in cooperative relationship with the first pair of tracks for providing a controlled displacement of the beam along the first pair of tracks in the spaced and perpendicular relationship to the tracks in accordance with the introduction of first polyphase signals to the first means, second means disposed on the second beam in cooperative relationship with the second pair of tracks for providing a controlled displacement of the beam along the second pair of tracks in the spaced and perpendicular relationship to the tracks in accordance with the introduction of second polyphase signals to the second means, an output member, and third and fourth means respectively disposed on individual ones of the first and second beams in spaced relationship to the other one of the first and second beams for providing a controlled displacement of the output member(s) along the first and second beams in accordance with the respective introduction of the second and first signals to the third and fourth means.

28. In a system set forth in claim 27, the first and second pairs of tracks having magnetic characteristics for respectively interacting with the first and second means in accordance with the respective introduction of the first and second polyphase signals to the first and second means to produce a force for displacement of the first means and the first beam along the first pair of tracks and to produce a force for displacement of the second means and the second beam along the second pair of tracks.

29. In the system set forth in claim 28, the first and second beams having magnetic characteristics for respective interacting with the third and fourth means in accordance with the respective introduction of the second and first polyphase signals to the third and fourth means to produce forces for displacement of the third and fourth means and the output member along the first and second beams to maintain the output member at the position of intersection of the first and second beams.

30. In the system set forth in claim 1, a plurality of tracks being disposed in spaced relationship to each other and in perpendicular relationship to the beam along the length of the beam and individual means corresponding to the first and second means being provided on the beam in association with individual ones of such tracks for cooperating with its associated track to produce with the associated track a motor for providing a controlled movement of the beam along the associated track in the spaced and perpendicular relationship to the associated track and being constructed to receive the first polyphase signals to provide identical displacements of the beam along the tracks and the first signal means introducing the first polyphase signals to the tracks in the plurality.

31. In the system set forth in claim 13, a plurality of tracks being disposed in spaced and parallel relationship to each other and in perpendicular relationship to the beam along the length of the beam and individual means corresponding to the first and second means being provided on the beam in association with individual ones of such tracks and defining a motor with its associated track for interacting with the associated track to produce an independent movement of the beam along the associated track in accordance with the introduction of the first polyphase signals to such individual means and the seventh means providing for the introduction of the first polyphase signals to such individual means.

32. In the system set forth in claim 7, a plurality of tracks being disposed in spaced and parallel relationship to each other and in perpendicular relationship to the beam along the length of the beam and in the form of magnetic grids and individual means corresponding to the first and second means being provided on the beam in association with individual ones of such tracks and being provided with magnetic properties and with a plurality of elements displaced in phase in a particular relationship to the grid on the associated track and to one another and energizable by the first polyphase signals in a particular sequence to provide displacements of the beam along the tracks and the fourth means providing for the introduction of the first polyphase signals to such individual means.

33. In the system set forth in claim 16, a plurality of tracks being disposed in spaced and parallel relationship to each other and in perpendicular relationship to the beam along the length of the beam and individual means corresponding to the first and second means being provided on the beam in association with individual ones of such tracks and cooperative with the associated track to define a reluctance motor with the associated track for producing an interaction between such individual means and the associated tracks in accordance with the introduction of the first polyphase signals to the individual means to provide a displacement of such individual means and the beam along the associated tracks and the fourth means providing for the introduction of the first polyphase signals to such individual means.

34. In the system set forth in claim 11, a plurality of tracks being disposed in spaced and parallel relationship to each other and in perpendicular relationship to the beam along the length of the beam and individual means corresponding to the first and second means being provided on the beam in association with individual ones of such tracks and being supported by the beam in contiguous but displaced relationship to the associated ones of the tracks for interacting with the associated track to produce an independent movement of the beam along the associated track in accordance with the introduction of the first polyphase signals to such individual means and the fourth means providing for the introduction of the first polyphase signals to such individual means.

* * * * *